US012587051B2

(12) United States Patent
Carrasco et al.

(10) Patent No.: US 12,587,051 B2
(45) Date of Patent: Mar. 24, 2026

(54) PERMANENT-MAGNET ROTOR RESISTANT TO THERMAL EXPANSION AND METHOD OF MANUFACTURE THEREOF

(71) Applicant: SKF MAGNETIC MECHATRONICS, Saint-Marcel (FR)

(72) Inventors: Eduardo Carrasco, Saint Etienne sous Bailleul (FR); Ramdane Lateb, Rouen (FR); Julien Vauby, Rouen (FR); Eddy Herisse, les Andelys (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 236 days.

(21) Appl. No.: 18/304,690

(22) Filed: Apr. 21, 2023

(65) Prior Publication Data

US 2023/0361639 A1     Nov. 9, 2023

(30) Foreign Application Priority Data

May 3, 2022     (FR) ..................................... 2204196

(51) Int. Cl.
| | |
|---|---|
| *H02K 1/28* | (2006.01) |
| *H02K 1/27* | (2022.01) |
| *H02K 1/278* | (2022.01) |
| *H02K 15/03* | (2006.01) |

(52) U.S. Cl.
CPC ............... *H02K 1/28* (2013.01); *H02K 1/278* (2013.01); *H02K 15/03* (2013.01)

(58) Field of Classification Search
CPC .......... H02K 1/28; H02K 1/278; H02K 15/03; H02K 1/2753; H02K 11/012; H02K 1/04
See application file for complete search history.

(56) References Cited

U.S. PATENT DOCUMENTS

| | | | | |
|---|---|---|---|---|
| 5,122,704 | A | * | 6/1992 | Blakeley .................. H02K 3/46 |
| | | | | 310/43 |
| 11,081,918 | B2 | | 8/2021 | Andonian et al. |
| 11,081,919 | B2 | | 8/2021 | Andonian et al. |
| 2003/0146670 | A1 | | 8/2003 | Van Dine |
| 2006/0141856 | A1 | | 6/2006 | Chen et al. |
| 2009/0261678 | A1 | | 10/2009 | Sortore et al. |
| 2015/0171675 | A1 | | 6/2015 | Carrasco et al. |
| 2015/0188369 | A1 | | 7/2015 | Arimatsu |
| 2018/0062466 | A1 | | 3/2018 | Mizuta et al. |

(Continued)

FOREIGN PATENT DOCUMENTS

| | | | |
|---|---|---|---|
| FR | | 3089363 A1 | 6/2020 |

OTHER PUBLICATIONS

Preliminary Search Report from the French Patent Office dated Dec. 15, 2022 in related French application No. FR2204196, including Search Report and Written Opinion.

*Primary Examiner* — Thomas Truong
(74) *Attorney, Agent, or Firm* — J-TEK LAW PLLC; Scott T. Wakeman; Mark A. Ussai

(57) ABSTRACT

A rotor includes an assembly hub intended to be fixed to a shaft, a plurality of permanent magnets which are supported by the assembly hub, and a binding band holding the plurality of permanent magnets in place. The binding band includes crossed windings of reinforcing fibers arranged around the plurality of permanent magnets. Preferably, the rotor further includes a retaining sleeve formed of a unidirectional winding of a reinforcing fiber arranged around the binding band.

10 Claims, 4 Drawing Sheets

(56)          References Cited

U.S. PATENT DOCUMENTS

| | | | | |
|---|---|---|---|---|
| 2018/0316246 A1* | 11/2018 | Andonian | ............. | H02K 1/278 |
| 2019/0109502 A1 | 4/2019 | Takano et al. | | |
| 2019/0199151 A1* | 6/2019 | Loder | ..................... | H02K 1/02 |
| 2023/0094490 A1* | 3/2023 | Ono | ...................... | H02K 1/278 |
| | | | | 310/156.28 |

* cited by examiner

FIG.2

PERMANENT-MAGNET ROTOR RESISTANT TO THERMAL EXPANSION AND METHOD OF MANUFACTURE THEREOF

CROSS-REFERENCE

This application claims priority to French Patent Application No. 2204196 filed on May 3, 2022, the entire contents of which are fully incorporated herein by reference.

BACKGROUND OF THE INVENTION

The present invention relates to a permanent-magnet rotor and to the method of manufacture thereof, in particular to a permanent-magnet rotor intended to rotate at very high speed, but also applies to any rotor or device intended to be subjected to a strong centrifugal force and to thermal expansion.

A permanent-magnet rotor generally comprises an assembly hub positioned around a shaft and configured to accept permanent magnets on an external surface of the assembly hub. The assembly hub is fixed around the shaft, for example by shrink-fitting or press-fitting the hub onto the shaft. The permanent magnets are held in contact with the assembly hub, for example, by adhesive bonding. However, excessive rotation speed of the rotor, and therefore too high of a centrifugal force, means that the adhesive bonding between the permanent magnets and the assembly hub cannot be guaranteed to hold the magnets on the hub.

In order to overcome this disadvantage, U.S. Pat. No. 11,081,919B2 proposes positioning a retaining sleeve around the rotor and, more particularly around the permanent magnets to prevent them from separating radially from the longitudinal axis of the rotor. The retaining sleeve is made of carbon fiber and formed by a unidirectional winding around the rotor. A copper sheath may also be interposed between the retaining sleeve and the permanent magnets.

However, under service conditions, the rotor may be subjected to temperatures which are sufficiently high so as to cause axial thermal expansion of all the materials of the rotor with the exception of the carbon fiber of the retaining sleeve, which is practically insensitive to axial thermal expansion. The difference between the expansion of the assembly hub, the permanent magnets and the copper sheath and the expansion of the carbon fiber retaining sleeve may mechanically weaken the retaining sleeve to the point of causing the winding of carbon fiber to delaminate, diminishing the ability of the retaining sleeve to perform its role of preventing radial separation of the magnets.

SUMMARY OF THE INVENTION

It is therefore an object of the present invention to overcome the aforementioned disadvantages and to provide a rotor able to withstand high rotational speeds and axial thermal expansion of the rotor.

In one aspect, the present invention is a rotor comprising an assembly hub intended or configured to be fixed to a shaft, a plurality of permanent magnets which are supported by the assembly hub, a binding band holding the plurality of permanent magnets in place, the binding band comprising crossed windings of reinforcing fibers arranged around the plurality of permanent magnets, and a retaining sleeve comprising a unidirectional winding of a reinforcing fiber arranged around the binding band.

What is meant by "cross windings" is at least two windings of reinforcing fibers which are wound around the annular assembly hub and the plurality of permanent magnets, the two windings making a non-zero angle with respect to one another, which angle may for example be greater than 20°. In particular, the crossed windings can be likened to a weaving-together of two interlaced windings of fibers.

Thus, the structure of the binding band offers better mechanical performance in the axial direction of the rotor and is therefore better able to withstand or prevent delamination in comparison to a unidirectional winding, in particular in the event of differential thermal expansion.

In one embodiment, the reinforcing fiber or fibers are resin impregnated carbon fibers.

In one particular embodiment, the assembly hub is made from a magnetic material.

Preferably, the rotor further comprises spacers, most preferably nonmagnetic spacers, supported by the assembly hub and each positioned circumferentially between two of the permanent magnets.

In one embodiment, the assembly hub comprises end plates which are configured to hold the plurality of permanent magnets axially in place, the end plates being fixed to a central portion of the assembly hub around which portion the plurality of permanent magnets are arranged or being formed as one with the central portion of the assembly hub.

In one particular embodiment, the rotor further comprises a nonmagnetic metal sheath positioned directly around the plurality of permanent magnets, the binding band being arranged radially around the metal sheath.

In another embodiment, the rotor further comprises a nonmagnetic metal sheath interposed radially between the assembly hub and the plurality of permanent magnets, the assembly hub supporting the plurality of permanent magnets via the nonmagnetic metal sheath.

Advantageously, the nonmagnetic metal sheath contains copper.

Another subject of the invention is a method for manufacturing a rotor as defined hereinabove, the method basically comprising the following steps:

fixing the plurality of permanent magnets in such a way that the assembly hub supports the permanent magnets;

fitting the binding band around the plurality of permanent magnets by weaving or by slipping on a pre-woven binding band about the plurality of magnets; and fitting the retaining sleeve around the binding band by weaving or by slipping on a pre-woven retaining sleeve about the plurality of magnets.

In one embodiment, the binding band comprises reinforcing fibers and a resin matrix, the reinforcing fibers being impregnated in a bath of resin prior to the step of fitting the binding band around the plurality of permanent magnets.

BRIEF DESCRIPTION OF THE SEVERAL VIEWS OF THE DRAWINGS

Further objects, features and advantages of the invention will become apparent from reading the following description, given solely by way of nonlimiting example and made with reference to the attached drawings in which:

FIG. 2 is a view in section II-II of FIG. 1;

DETAILED DESCRIPTION OF THE INVENTION

Figure 1:
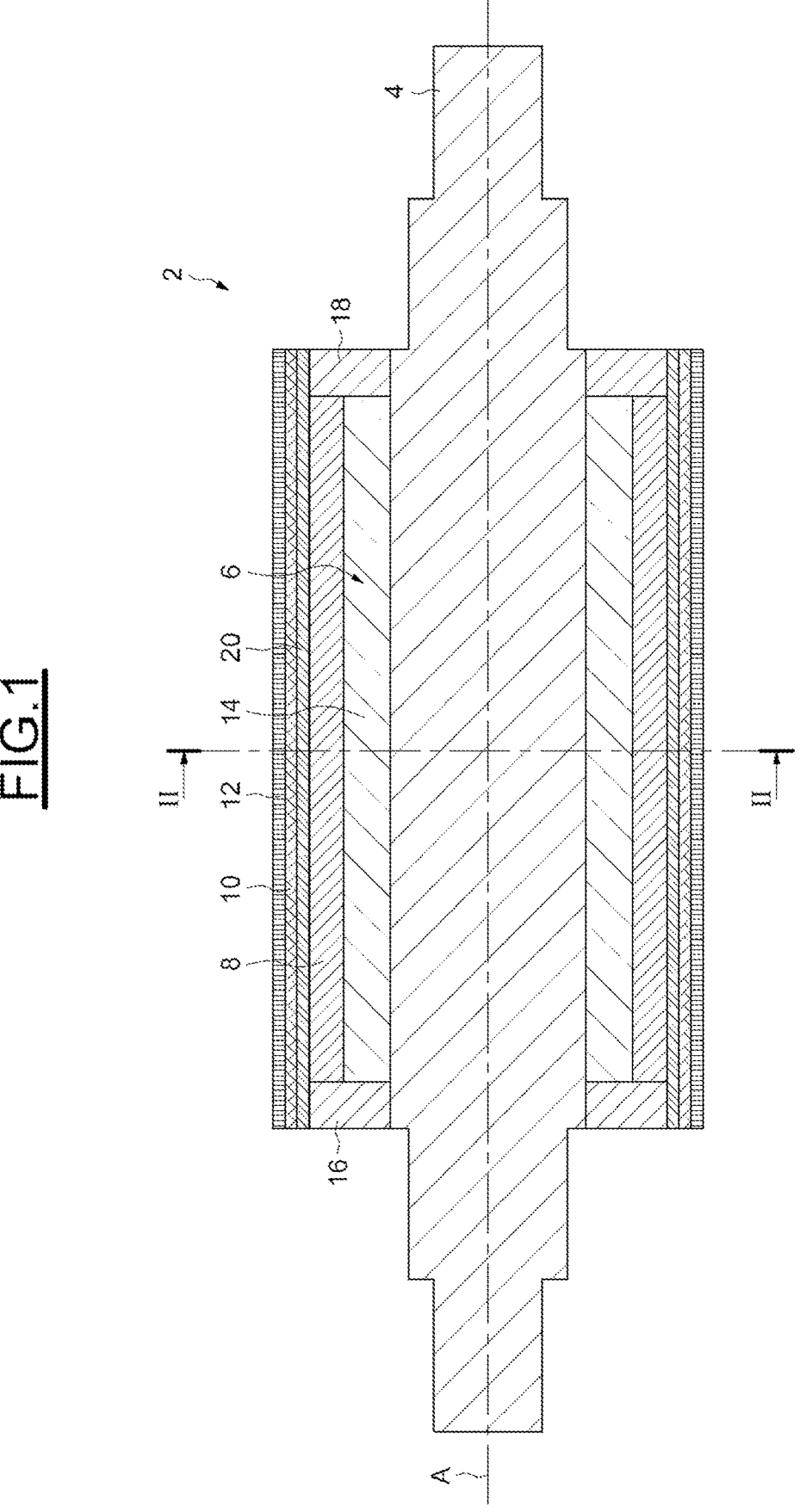
FIG. 1 is a schematic view in longitudinal section of a rotor according to the invention and in a first embodiment.

FIG. 1 schematically depicts a view in longitudinal section of one embodiment of a rotor 2 of the present invention, the rotor 2 being shown mounted on a shaft 4. The rotor 2, with a longitudinal axis of rotation A, has a generally cylindrical overall shape and a circular cross section. The rotor 2 basically comprises an assembly hub 6 fixed around the shaft 4, a plurality of permanent magnets 8 supported by the assembly hub 6 and a binding band 10. The permanent magnets 8 are mounted around the assembly hub 6 and are fixed thereto. The binding band 10 is positioned radially around the plurality of permanent magnets 8 such that the binding band 10 is configured to hold the plurality of permanent magnets 8 radially in place about the hub 6.

In particular, the binding band 10 comprises crossed windings of reinforcing fibers, for example carbon fibers. In the present disclosure, the term "crossed windings" means at least two windings of reinforcing fibers are wound around a cylinder formed by the assembly hub 6 and the plurality of permanent magnets 8, the two windings making or defining a non-zero angle with respect to each other. In particular, the crossed windings comprise a weaving-together or interweaving of two windings of reinforcing fibers which are interlaced.

In one embodiment, two fibers make or define an angle between the two fibers having a value of between 10° and 100°, such that each fiber makes/defines an angle of between 5° and 50° with respect to the axis of rotation A of the rotor 2, but with different orientations relative to the axis of rotation A (i.e., one fiber extends in one axial direction and the other fiber extends in an opposing axial direction).

Preferably, the binding band 10 comprises or includes reinforcing fibers and a resin matrix (not depicted), for example a thermoplastic or a thermosetting polymer matrix, so that the binding band 10 forms a rigid composite of fibers and resin. Most preferably, the reinforcing fibers are impregnated with resin by passing the binding band 10 through a bath of resin, the resin forming a resin matrix in the binding band 10. The binding band 10, once fitted, has an annular shape. Alternatively, the reinforcing fibers are pre-impregnated with resin before weaving the fibers to form the binding band 10.

The binding band 10, by virtue of having a crossed-winding structure, is stronger than a conventional binding band in the event of axial deformation. In the event of axial thermal expansion of the rotor 2, the binding band 10 is not delaminated and maintains its integrity.

In the exemplary embodiment depicted in the drawing figures, the rotor 2 further comprises a retaining sleeve 12 positioned radially around the binding band 10. The retaining sleeve 12 radially contacts or circumferentially surrounds the binding band 10.

More specifically, the retaining sleeve 12 includes a unidirectional, particularly circumferential, winding of a reinforcing fiber, for example a carbon fiber, and a resin matrix, for example a thermoplastic or a thermosetting polymer matrix. The unidirectional winding is produced by winding reinforcing fiber around the binding band 10, the fiber forming an angle of between 75° and 90° with respect to the axis of rotation A of the rotor 2, the fibers of the retaining sleeve 12 being able to be wound alternately in opposite directions relative to the axis of rotation A at the same angle. The retaining sleeve 12 is configured to ensure that the plurality of permanent magnets 8 will not be subjected to radial separation, a unidirectional winding being more resistant to a radial force than cross-windings.

Due to the retaining sleeve 12 being positioned on the outside or outer surface of the binding band 10, the binding band 10 absorbs (where applicable) the axial mechanical stresses caused, for example, by the thermal expansion of the rotor 2, such that the retaining sleeve 12 is therefore not likely to become damaged.

The retaining sleeve 12, once fitted about the binding band 10, has an annular shape. The retaining sleeve 12 and the binding band 10 may be produced progressively so as to form a single annular tube (i.e., consisting of the binding band 10 and the retaining sleeve 12) which may then be fitted as a unit upon the rotor 2 over the permanent magnets 8.

The assembly hub 6 is preferably formed of a metallic material, most preferably a magnetic metallic material. A magnetic assembly hub 6 in particular provides better concentration of the magnetic flux of the permanent magnets 8. A magnetic flux concentration suited to the use of the rotor 2 thus means that the permanent magnets 8 need not be oversized for use of the rotor 2.

The assembly hub 6 includes an annular central portion 14 around which and upon which the permanent magnets 8 are mounted. The central portion 14 may be, for example, shrink fitted onto the shaft 4 by heating the central portion 14 and/or cooling the shaft 4.

The assembly hub 6 further includes two end plates 16 and 18 each positioned at a separate one of the two longitudinal ends of the assembly hub 6. The two end plates 16 and 18 hold or retain the plurality of permanent magnets 8 axially in place while the central portion 14 of the assembly hub 6 and the binding band 10 hold the permanent magnets 8 radially in place.

According to one option as depicted, the end plates 16, 18 are separate from and fixed to the central portion 14 of the assembly hub 6, for example, by adhesive bonding, one or more fasteners or, preferably, by means of shrink-fitting. According to another option, the end plates 16, 18 may be formed as one piece with, or integrally formed with, the central portion 14 of the assembly hub 6. What is meant by "formed in one piece with" is that the end plates 16, 18 are cast, machined or welded with the central portion 14 so that there is continuity of material between the end plates 16, 18 and the central portion 14.

In the depicted embodiment, the rotor 2 further comprises a nonmagnetic metal sheath 20 positioned radially around or disposed about the plurality of permanent magnets 8. The metal sheath 20 radially contacts the permanent magnets 8 and radially contacts the binding band 10. In other words, the metal sheath 20 is interposed or disposed radially between the binding band 10 and the permanent magnets 8. Further, the metal sheath 20 has a generally annular shape and is formed, for example, of copper. In particular, the metal sheath 20 is able or configured to filter out the high frequency magnetic fields which are liable to heat the permanent magnets 8 and harm the performance of the rotor 2.

Preferably, the metal sheath 20 radially covers or surrounds the permanent magnets 8 and the two end plates 16 and 18. Alternatively, the metal sheath 20 may only cover the permanent magnets 8. In a second alternative, the metal sheath 20 only covers the permanent magnets 8 and the end plate 18, the end plate 18 being integrally formed with the central portion 14 of the assembly hub 6.

Figure 2:
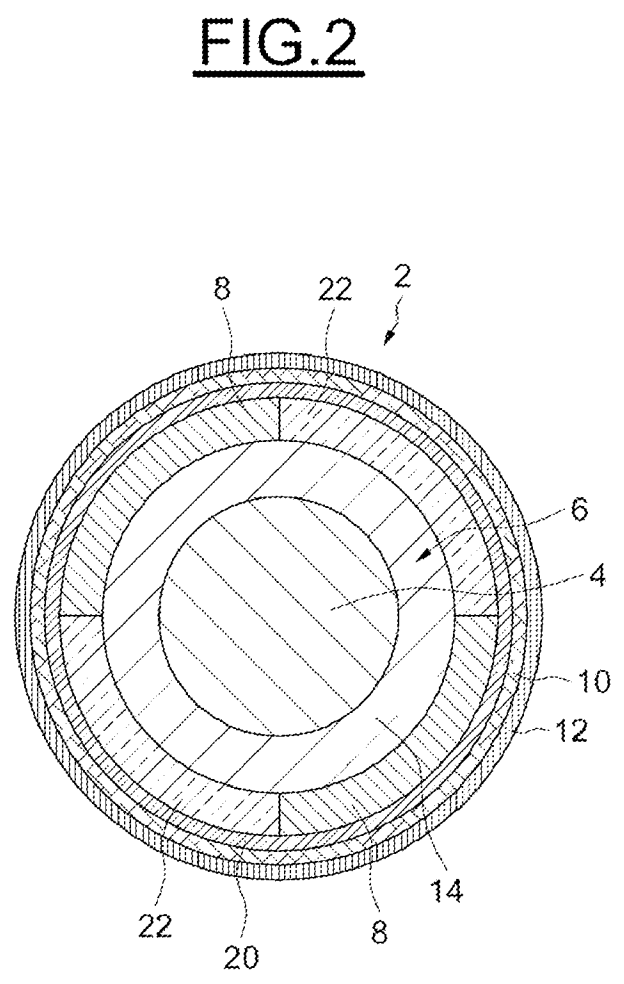

FIG. 2 is a schematic, radial cross-sectional view of the embodiment of the rotor 2 illustrated in FIG. 1. As shown in FIG. 2, the permanent magnets 8 are each preferably formed as an annular segment.

In the illustrated exemplary embodiment, the rotor 2 further comprises spacers, preferably nonmagnetic spacers 22, supported by the assembly hub 6 and positioned between the permanent magnets 8, the permanent magnets 8 and the nonmagnetic spacers 22 being situated or located at the same radial distance from the axis of rotation A of the rotor 2. Each nonmagnetic spacer 22 is interposed circumferentially between two permanent magnets 8 of different polarity.

Figure 3:
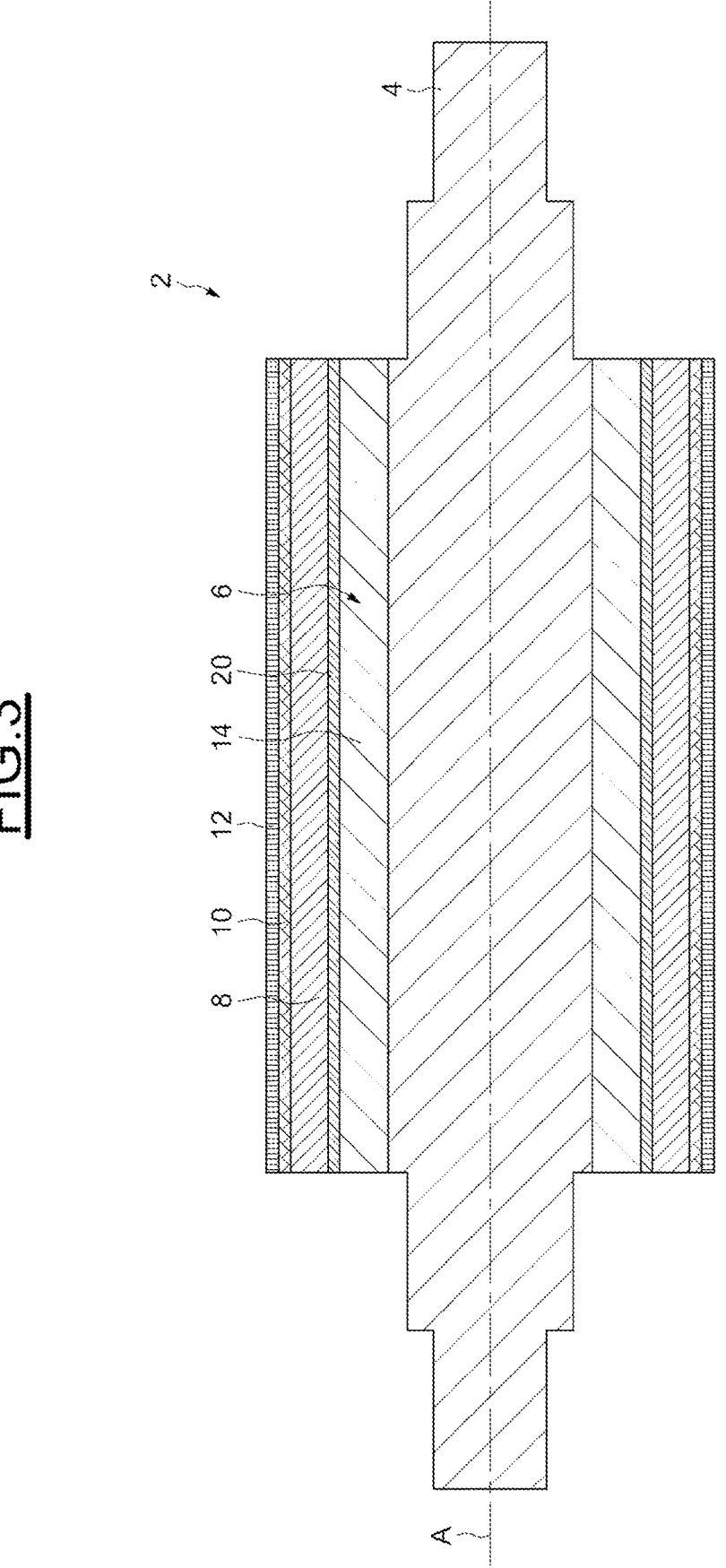
FIG. 3 is a schematic view in longitudinal section of a rotor according to the invention and in a second embodiment.

FIG. 3 schematically depicts, in a longitudinal section view, a second embodiment of the rotor 2 according to the present invention shown mounted on a shaft 4. The second embodiment differs from the previous, first embodiment primarily in terms of the location of the metal sheath 20. In the second embodiment, the metal sheath 20 is interposed radially between the assembly hub 6 and the plurality of permanent magnets 8. The permanent magnets 8 are fixed to the metal sheath 20 and are supported by the assembly hub 6 via or through the metal sheath 20.

In the second embodiment, the rotor 2 does not include any end plates. However, the rotor 2 of the second embodiment may alternatively include end plates equivalent to the end plates 16, 18 of the first embodiment rotor 2. When present, the end plates of the second embodiment have an additional thickness equal to the thickness of the metal sheath 20.

Figure 4:
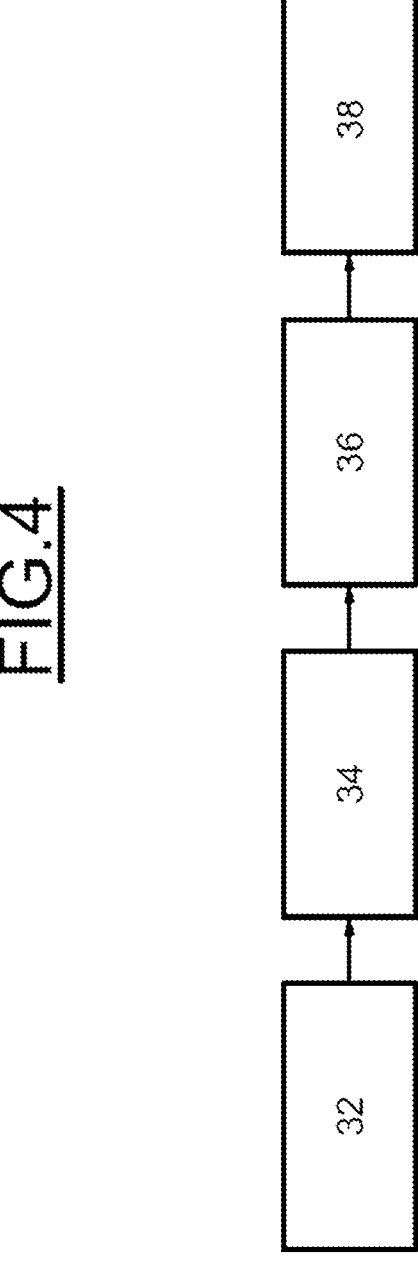
FIG. 4 is a depiction of the various steps of the method for manufacturing the rotor according to the invention.

FIG. 4 schematically depicts the various steps of a method for manufacturing a rotor 2 according to the present invention, in particular the first embodiment illustrated in FIGS. 1 and 2.

For the first embodiment, in a first step 32, the plurality of permanent magnets 8 is fixed to the central portion 14 of the assembly hub 6. This fixing step 32 is performed, for example, using adhesive bonding, screw fastening or by slipping or inserting at least a portion of each permanent magnet 8 into one or more slots machined for the purpose of fixing the magnets 8 to the assembly hub 6.

In a second step 34, the metal sheath 20 is slipped around the assembly hub 6 and the plurality of permanent magnets 8. In a variant of the rotor manufacturing method, the second step 34 is performed using shrink fitting.

For the manufacture of the rotor 2 according to the second embodiment, steps 32 and 34 are performed in the reverse order and the plurality of permanent magnets 8 are each fixed to the metal sheath 20 such that the assembly hub 6 supports the permanent magnets 8 in both embodiments.

A step 36 of fitting the binding band 10 around the plurality of permanent magnets 8 is then performed. This step 36 is performed by weaving the binding band 10 directly onto the rotor 2 or by slipping on a binding band 10 that has been pre-woven beforehand on an external mandrel.

In a similar manner, a step 38 of fitting the retaining sleeve 12 is performed by winding a reinforcing fiber around the binding band 10. Optionally, a second binding band (not depicted) is positioned around the retaining sleeve 12.

In one particular embodiment, a step (not depicted) of impregnating reinforcing fibers in a bath of resin is performed prior to the step of fitting the binding band 10 and/or the retaining sleeve 12.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A rotor comprising:
   an assembly hub configured to be fixed to a shaft;
   a plurality of permanent magnets supported by the assembly hub;
   a binding band configured to retain the plurality of permanent magnets on the assembly hub, the binding band including crossed windings of reinforcing fibers arranged around the plurality of permanent magnets; and
   a retaining sleeve including a unidirectional winding of a reinforcing fiber disposed around the binding band.

2. The rotor according to claim 1, wherein each reinforcing fiber is a resin impregnated carbon fiber.

3. The rotor according to claim 1, wherein the assembly hub is formed of a magnetic material.

4. The rotor according to claim 1, further comprising spacers supported by the assembly hub, each spacer being positioned circumferentially between two of the permanent magnets.

5. The rotor according to claim 4, wherein the spacers are formed of a nonmagnetic material.

6. The rotor according to claim 1, wherein the assembly hub includes a central portion and two end plates, each end plate being fixed to or integrally formed with the central portion, the plurality of permanent magnets being arranged around the central portion of the assembly hub and the end plates being configured to hold the plurality of permanent magnets axially in place.

7. The rotor according to claim 1, further comprising a nonmagnetic metal sheath positioned directly around the plurality of permanent magnets, the binding band being arranged radially around the metal sheath.

8. The rotor according to claim 7, wherein the nonmagnetic metal sheath contains copper.

9. The rotor according to claim 1, further comprising a nonmagnetic metal sheath interposed radially between the assembly hub and the plurality of permanent magnets, the assembly hub supporting the plurality of permanent magnets through the nonmagnetic metal sheath.

10. The rotor according to claim 9, wherein the nonmagnetic metal sheath contains copper.

* * * * *